(12) United States Patent
Brey et al.

(10) Patent No.: US 8,103,884 B2
(45) Date of Patent: Jan. 24, 2012

(54) MANAGING POWER CONSUMPTION OF A COMPUTER

(75) Inventors: Thomas M. Brey, Cary, NC (US);
Wesley M. Felter, Austin, TX (US);
Sumeet Kochar, Apex, NC (US);
Charles R. Lefurgy, Austin, TX (US);
Ryuji Orita, Redmond, WA (US);
Freeman L. Rawson, III, Austin, TX (US); Malcolm S. Ware, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 845 days.

(21) Appl. No.: 12/146,085

(22) Filed: Jun. 25, 2008

(65) Prior Publication Data

US 2009/0327765 A1 Dec. 31, 2009

(51) Int. Cl.
*G06F 1/26* (2006.01)
(52) U.S. Cl. ....................... 713/300; 713/320
(58) Field of Classification Search .......... 713/300, 713/323
See application file for complete search history.

(56) References Cited

U.S. PATENT DOCUMENTS

| | | | |
|---|---|---|---|
| 3,602,703 A | 8/1971 | Polenz | |
| 5,623,450 A | 4/1997 | Phillips et al. | |
| 5,630,148 A | 5/1997 | Norris | |
| 5,719,800 A | 2/1998 | Mittal et al. | |
| 5,745,375 A | 4/1998 | Reinhardt et al. | |
| 5,812,860 A | 9/1998 | Horden et al. | |
| 5,941,991 A | 8/1999 | Kageshima | |
| 6,002,878 A | 12/1999 | Gehman et al. | |
| 6,038,636 A | 3/2000 | Brown, III et al. | |
| 6,125,334 A | 9/2000 | Hurd | |
| 6,141,021 A | 10/2000 | Bickford et al. | |
| 6,385,113 B1 | 5/2002 | Longwell et al. | |
| 6,513,145 B1 | 1/2003 | Venkitakrishnan | |
| 6,624,816 B1 | 9/2003 | Jones, Jr. | |
| 6,628,469 B1 | 9/2003 | Hoyt | |
| 6,657,634 B1 | 12/2003 | Sinclair et al. | |
| 6,661,671 B1 | 12/2003 | Franke et al. | |
| 6,665,806 B1 | 12/2003 | Shimizu | |

(Continued)

FOREIGN PATENT DOCUMENTS

DE 20 2004 018 289 3/2005

(Continued)

OTHER PUBLICATIONS

PCT Search Report, Feb. 22, 2010; PCT Application No. PCT/EP2009/057910.

(Continued)

*Primary Examiner* — Nitin Patel
(74) *Attorney, Agent, or Firm* — H. Barrett Spraggins; Cynrthia G. Seal; Biggers & Ohanian, LLP

(57) ABSTRACT

Methods and products for managing power consumption of a computer and computers for which power consumption is managed. The computer includes the computer including a computer processor and embodiments of the present invention include providing, by an in-band power manger to an out-of-band power manager, a proposed performance state ('p-state') for the computer processor; determining, by the out-of-band power manager, in dependence upon a power setpoint and currently-measured operating metrics of the computer processor, whether to approve the proposed p-state; and if the out-of-band power manager approves the proposed p-state, setting operating parameters of the computer processor according to the approved p-state.

20 Claims, 3 Drawing Sheets

U.S. PATENT DOCUMENTS

| | | | |
|---|---|---|---|
| 6,766,420 | B2 | 7/2004 | Rawson, III |
| 6,795,896 | B1 | 9/2004 | Hart |
| 6,820,222 | B2 | 11/2004 | Swoboda |
| 6,862,672 | B1 | 3/2005 | Furudate et al. |
| 6,916,815 | B2 | 7/2005 | Vite et al. |
| 7,002,884 | B2 | 2/2006 | Schmidt et al. |
| 7,010,656 | B2 | 3/2006 | Gupta |
| 7,036,030 | B1 | 4/2006 | Altmejd |
| 7,043,647 | B2 | 5/2006 | Hansen et al. |
| 7,069,463 | B2 | 6/2006 | Oh |
| 7,134,011 | B2 | 11/2006 | Fung |
| 7,155,621 | B2 | 12/2006 | Dai |
| 7,155,623 | B2 | 12/2006 | Lefurgy et al. |
| 7,219,241 | B2 | 5/2007 | Cooper et al. |
| 7,240,225 | B2 | 7/2007 | Brewer et al. |
| 7,284,067 | B2 | 10/2007 | Leigh |
| 7,318,164 | B2 | 1/2008 | Rawson, III |
| 7,345,689 | B2 | 3/2008 | Janus et al. |
| 7,353,415 | B2 * | 4/2008 | Zaretsky et al. ............. 713/320 |
| 7,444,526 | B2 | 10/2008 | Felter et al. |
| 7,516,348 | B1 | 4/2009 | Ofer |
| 7,581,130 | B2 | 8/2009 | Carroll et al. |
| 7,607,030 | B2 * | 10/2009 | Goodrum et al. ............. 713/300 |
| 7,788,513 | B2 | 8/2010 | Vaden |
| 2001/0032298 | A1 | 10/2001 | Emons |
| 2002/0004912 | A1 | 1/2002 | Fung |
| 2002/0087896 | A1 | 7/2002 | Cline et al. |
| 2002/0133792 | A1 | 9/2002 | Raghunathan et al. |
| 2003/0051104 | A1 | 3/2003 | Riedel |
| 2003/0056125 | A1 | 3/2003 | O'Conner et al. |
| 2003/0105984 | A1 | 6/2003 | Masuyama et al. |
| 2003/0112582 | A1 | 6/2003 | Sanders et al. |
| 2003/0117759 | A1 | 6/2003 | Cooper |
| 2003/0120772 | A1 | 6/2003 | Husain et al. |
| 2003/0125886 | A1 | 7/2003 | Spitaels et al. |
| 2003/0188222 | A1 | 10/2003 | Abbondanzio et al. |
| 2003/0229821 | A1 | 12/2003 | Ma |
| 2004/0003303 | A1 | 1/2004 | Oehler et al. |
| 2004/0024831 | A1 | 2/2004 | Yang et al. |
| 2004/0030939 | A1 | 2/2004 | Barr et al. |
| 2004/0030941 | A1 | 2/2004 | Barr et al. |
| 2004/0148060 | A1 | 7/2004 | Lee |
| 2004/0243886 | A1 | 12/2004 | Klein |
| 2004/0268166 | A1 | 12/2004 | Farkas et al. |
| 2005/0015632 | A1 * | 1/2005 | Chheda et al. ................ 713/300 |
| 2005/0060590 | A1 | 3/2005 | Bradley et al. |
| 2005/0060591 | A1 | 3/2005 | Yoshiyama et al. |
| 2005/0102544 | A1 | 5/2005 | Brewer et al. |
| 2005/0134593 | A1 | 6/2005 | Janus et al. |
| 2005/0138438 | A1 | 6/2005 | Bodas |
| 2005/0229226 | A1 | 10/2005 | Relan et al. |
| 2005/0244131 | A1 | 11/2005 | Uehara |
| 2005/0262365 | A1 | 11/2005 | Lint et al. |
| 2005/0289361 | A1 | 12/2005 | Sutardja |
| 2005/0289362 | A1 | 12/2005 | Merkin et al. |
| 2005/0289367 | A1 | 12/2005 | Clark et al. |
| 2006/0007203 | A1 | 1/2006 | Chen et al. |
| 2006/0156041 | A1 | 7/2006 | Zaretsky et al. |
| 2006/0161794 | A1 | 7/2006 | Chiasson et al. |
| 2006/0190745 | A1 | 8/2006 | Matsushima et al. |
| 2006/0230299 | A1 | 10/2006 | Zaretsky et al. |
| 2006/0248354 | A1 | 11/2006 | Pineda De Gyvez et al. |
| 2006/0248356 | A1 | 11/2006 | Won et al. |
| 2006/0253715 | A1 | 11/2006 | Ghiasi et al. |
| 2007/0033425 | A1 | 2/2007 | Clark |
| 2007/0073969 | A1 | 3/2007 | Guha et al. |
| 2007/0162632 | A1 | 7/2007 | Ng et al. |
| 2007/0162692 | A1 | 7/2007 | Nishimoto et al. |
| 2007/0162776 | A1 | 7/2007 | Carpenter et al. |
| 2007/0245161 | A1 | 10/2007 | Shaw et al. |
| 2007/0260897 | A1 | 11/2007 | Cochran et al. |
| 2008/0018653 | A1 | 1/2008 | Liu |
| 2008/0077817 | A1 | 3/2008 | Brundridge et al. |
| 2008/0094403 | A1 | 4/2008 | Bakalash et al. |
| 2008/0204460 | A1 | 8/2008 | Marinkovic et al. |
| 2008/0229050 | A1 | 9/2008 | Tillgren |
| 2008/0320203 | A1 | 12/2008 | Fitzgerald |
| 2009/0070611 | A1 | 3/2009 | Bower et al. |
| 2009/0089595 | A1 | 4/2009 | Brey et al. |
| 2009/0132842 | A1 | 5/2009 | Brey et al. |
| 2009/0235105 | A1 * | 9/2009 | Branover et al. ............. 713/330 |

FOREIGN PATENT DOCUMENTS

| | | |
|---|---|---|
| WO | WO 2005/069148 | 7/2005 |
| WO | WO 2007/140404 | 12/2007 |

OTHER PUBLICATIONS

Advanced Configuration and Power Interface Specification Rev 2.0; Jul. 27, 2000; pp. 1-27 and 211-230.

Pinheiro, et al.; Load Balancing and Unbalancing for Power and Performance in Cluster-Based Systems; pp. 4-1-4-8; Department of Computer Science, Rutgers University; Piscataway, NJ, 2001.

Soteriou, et al.; Software-Directed Power-Aware Interconnection Networks; Department of Electrical Engineering, Princeton University; Sep. 24-27, 2005; pp. 274-285; Cases 2005; Princeton, NJ.

Luecke; High-Speed/Low-Power Selectable Optical File; Research Disclosure n315 07-90; Jul. 1990; AAA90A963914; San Jose.

Otteson; Adaptive Just-In-Time Velocity profile Algorithm for Power Savings in a Direct Access Storage Device; TDB v41 n1 Jan. 1998 p. 733-736; AAA98A060205; Rochester, MN.

Pisharath, et al; Reducing Energy Consumption of Queries in Memory-Resident Database Systems; International Conference on Compilers, Architectures and Synthesis of Embedded Systems; Sep. 23, 2004.

Dhiman et al.; Dynamic Power Management Using Machine Learning; ICCAD'06; Nov. 2006; ACM 1-59593-389—Jan. 6, 2011; San Jose, CA, USA.

Watts, et al.; Engineering Economics, Section 5, Chapter 7, SFPE Handbook of Fire Protection Engineering, NFPA, Quincy, MA 2002.

PCT Search Report and Written Opinion, Oct. 21, 2010; PCT Application No. PCT/EP2009/064818.

Office Action, U.S. Appl. No. 11/285,325, USPTO Mail Date Mar. 18, 2008.

Notice of Allowance, U.S. Appl. No. 11/285,325, USPTO Mail Date Jul. 25, 2008.

Office Action, U.S. Appl. No. 11/946,506, USPTO Mail Date Jul. 21, 2009.

Final Office Action, U.S. Appl. No. 11/946,506, USPTO Mail Date Feb. 22, 2010.

Office Action, U.S. Appl. No. 11/946,506, USPTO Mail Date Nov. 28, 2007.

Office Action, U.S. Appl. No. 11/859,829, USPTO Mail Date Apr. 7, 2010.

Office Action, U.S. Appl. No. 11/946,506, USPTO Mail Date Nov. 22, 2010.

Office Action, U.S. Appl. No. 11/940,896, USPTO Mail Date Jun. 29, 2010.

Office Action, U.S. Appl. No. 11/940,896, USPTO Mail Date Dec. 3, 2010.

Compaq Computer Corporation, et al. Advanced Configuration and Power Interface Specification Rev 2.0; Jul. 27, 2000; pp. 1-27 and 211-230.

Koyangi et al.; Control of Spindle Motor Velocity in Load/Unload Hard Disk Drive; TDB v38 n12 Dec. 1995 p. 551-552; AAA95A062553; Japan.

Final Office Action, U.S. Appl. No. 11/940,896, USPTO Mail Date Apr. 6, 2011.

Final Office Action, U.S. Appl. No. 11/946,506, USPTO Mail Date Apr. 11, 2011.

Office Action, U.S. Appl. No. 12/146,08, USPTO Mail Date May 19, 2011.

* cited by examiner

MANAGING POWER CONSUMPTION OF A COMPUTER

BACKGROUND OF THE INVENTION

1. Field of the Invention

The field of the invention is data processing, or, more specifically, methods and products for managing power consumption of a computer and computers for which power consumption is managed.

2. Description of Related Art

The development of the EDVAC computer of 1948 is often cited as the beginning of the computer era. Since that time, computers have evolved into extremely complicated devices. Today's computers are much more sophisticated than early systems such as the EDVAC. Computers typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computers today that are much more powerful than just a few years ago.

Computer systems today may consume a large amount of power and generate a large amount of heat. To control power consumption and heat generation of computers, operating system ('OS') and computer processor designers have implemented power management techniques that are carried out by the OS, like the Advanced Configuration and Power Interface ('ACPI') modules of most modern operating systems. Such OS-based power management techniques, manage power consumption of a computer in dependence upon the performance of the computer processor. Other power management techniques have been implemented in computers in software not executing as part of the OS. In fact, such non-OS-based power management techniques are typically implemented in software executing on a processor, such as a service processor, that is not the computer's primary processor. Such non-OS-based power management techniques manage power consumption of a computer processor only in dependence measured temperature, current, power values, and the like, not in dependence upon the performance of the computer processor. While both the OS-based and non-OS-based may manage power consumption in one computer concurrently, there is currently no cooperation between such OS-based power management and non-OS-based power management techniques. As such, OS-based and non-OS-based power management techniques often conflict in managing power consumption of the computer system.

SUMMARY OF THE INVENTION

Methods and products for managing power consumption of a computer and computers for which power consumption is managed. The computer includes the computer including a computer processor and embodiments of the present invention include providing, by an in-band power manger to an out-of-band power manager, a proposed performance state ('p-state') for the computer processor; determining, by the out-of-band power manager, in dependence upon a power setpoint and currently-measured operating metrics of the computer processor, whether to approve the proposed p-state; and if the out-of-band power manager approves the proposed p-state, setting operating parameters of the computer processor according to the approved p-state.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
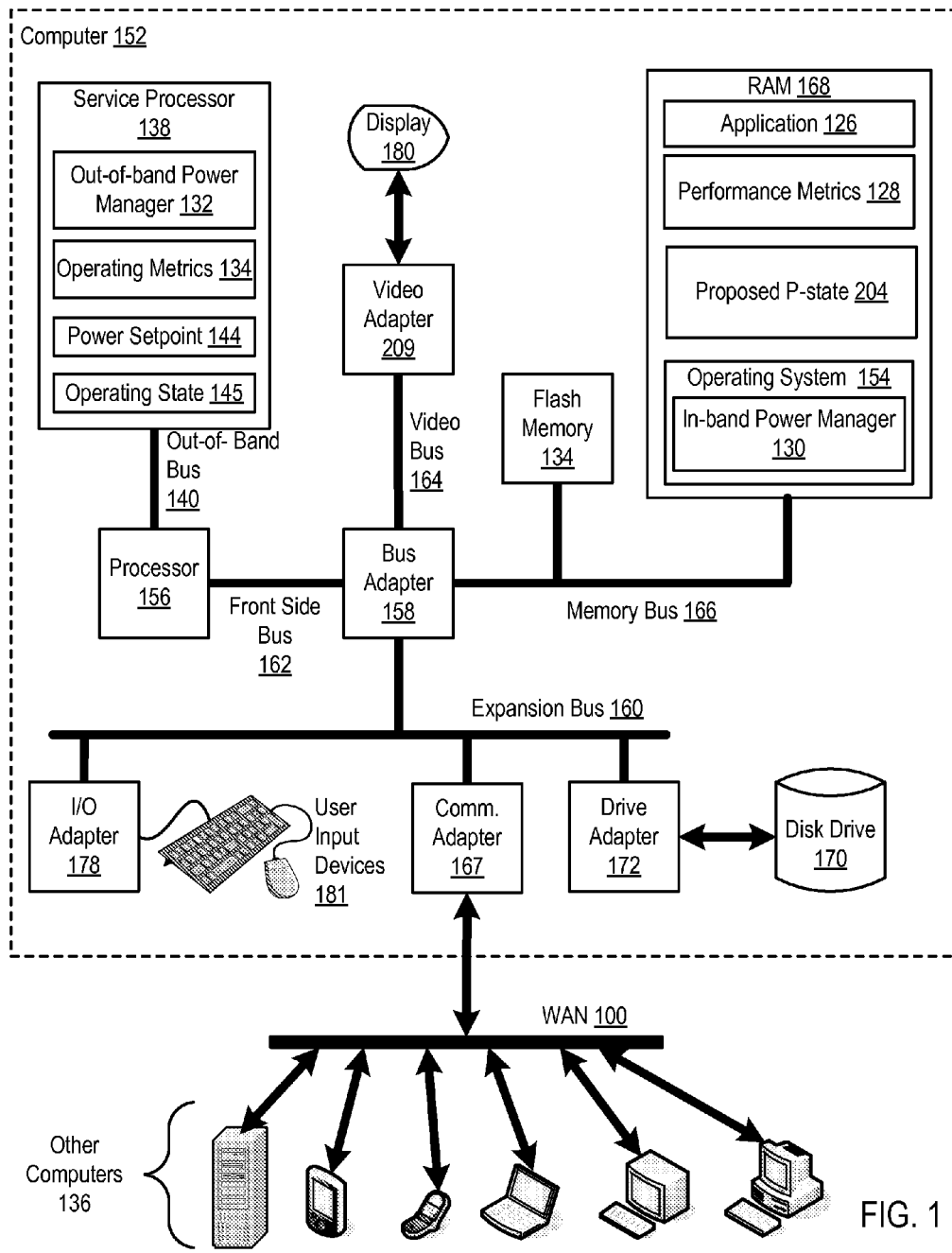
FIG. 1 sets forth a functional block diagram of an exemplary system that includes a computer for which power consumption is managed according to embodiments of the present invention.

Exemplary methods, computers, and products for power management in a computer in accordance with the present invention are described with reference to the accompanying drawings, beginning with FIG. 1. FIG. 1 sets forth a functional block diagram of an exemplary system that includes a computer (152) for which power consumption is managed according to embodiments of the present invention.

The computer (152) comprises automated computing machinery for which power consumption is managed in accordance with embodiments of the present invention. An example of such automated computing machinery for which power consumption may be managed according to embodiments of the present invention is a blade server. A server, as the term is used in this specification, refers generally to a multi-user computer that provides a service (e.g. database access, file transfer, remote access) or resources (e.g. file space) over a network connection. The term 'server,' as context requires, refers inclusively to the server's computer hardware as well as any server application software or operating system software running on the server. A server application is an application program that accepts connections in order to service requests from users by sending back responses. A server application can run on the same computer as the client application using it, or a server application can accept connections through a computer network. Examples of server applications include file server, database server, backup server, print server, mail server, web server, FTP servers, application servers, VPN servers, DHCP servers, DNS servers, WINS servers, logon servers, security servers, domain controllers, backup domain controllers, proxy servers, firewalls, and so on.

Blade servers are self-contained servers, designed for high density. A blade enclosure provides services such as power, cooling, networking, various interconnects and management—though different blade providers have differing principles around what should and should not be included in the blade itself—and sometimes in the enclosure altogether. Together, a set of blade servers installed in a blade enclosure or 'blade center' for a blade system. As a practical matter, all computers are implemented with electrical components requiring power that produces heat. Components such as processors, memory, hard drives, power supplies, storage and network connections, keyboards, video components, a mouse, and so on, merely support the basic computing function, yet they all add bulk, heat, complexity, and moving parts that are more prone to failure than solid-state components. In the blade paradigm, most of these functions are removed from the blade computer, being either provided by the blade enclosure (DC power) virtualized (iSCSI storage, remote console over IP), or discarded entirely (serial ports). The blade itself becomes simpler, smaller, and amenable to dense installation with many blade servers in a single blade enclosure.

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152). Stored in RAM (168) is an application (126), a set of computer program instructions for user-level data processing. Examples of such software applications include server applications, word processors, spreadsheet applications, media players, and so on as will occur to those of skill in the art.

Also stored in RAM (168) is an operating system (154). Operating systems useful for managing power consumption of a computer according to embodiments of the present invention include UNIX™, Linux™, Microsoft XP™, Microsoft Vista™, AIX™, IBM's i5/OS™, and others as will occur to those of skill in the art. The operating system (154) in the example of FIG. 1 includes an in-band power manager (130). An in-band power manager (130) is a set of computer program instructions that manages power consumption of the computer (152) in accordance with embodiments of the present invention by providing, by an in-band power manger (130) to an out-of-band power manager (132), a proposed performance state ('p-state') (204) for the computer processor (156).

The term 'in-band' as used in this specification refers to a power manager of a computer that executes on a computer processor for which operating parameters are varied in managing power consumption of the computer according to embodiments of the present invention. For ease of understanding, such computer processor may be though of as a 'primary,' 'main,' or 'in-band' processor that executes user-level software applications, an operating system, and the like. In the computer of FIG. 1, the in-band power manager executes on the processor (156), a processor for which operating parameters are varied in managing power consumption of the computer (152) according to embodiments of the present invention. An out-of-band power manager, by contrast, is not executed by the computer processor for which operating parameters are varied, but instead, executes on another computer processor. For ease of understanding, such computer processors that execute out-of-band power managers may be thought of, by analogy, as 'secondary,' 'out-of-band,' or 'service' processors that execute system-level firmware, not user-level applications. The out-of-band power manager (132), in the example of FIG. 1, executes on the service processor (138), a processor for which operating parameters are not varied in managing power consumption of the computer (152).

The in-band power manager (132) may determine a p-state to propose in dependence upon performance metrics of a computer processor. Performance metrics (128) of a computer processor (156) are information that describes actual performance of the computer processor. Examples of performance metrics (128) include a measure of computer processor utilization, values of hardware performance counters, and so on as will occur to those of skill in the art. Hardware performance counters, also called hardware counters, are a set of special-purpose registers implemented in many microprocessors to store counts of hardware-related activities within a computer. Examples of counts of hardware-related activities stored in the hardware performance counters include data cache misses, instruction cache, misses, cycles stalled waiting for memory access, cycles with no instruction issued, cycles with maximum instruction issued, and so on as will occur to those of skill in the art.

A performance state ('p-state') defines an operational state of a computer processor by specifying a core voltage level for the computer processor and a clock speed of the computer processor. A core voltage of a computer processor is the voltage level of the voltage regulator of the computer processor. P-states may be organized into a number of different levels where lower level p-states generally represent greater performance by a processor, higher core voltage levels, and higher clock speeds, and higher level p-states generally represent lower performance by a processor, lower core voltage levels, and lower clock speeds. The power of a computer processor is proportional to the clock speed and core voltage of the processor. The core voltage of a computer processor then is affected then by variations in clock speed. Readers of skill in the art will immediately that core voltage and clock speed are variable and lowering either value reduces power consumption of the computer processor. When a computer processor is under a low load, as indicated by the performance metrics (128) of the computer processor, the in-band power manager (130) may set the current p-state of the computer processor to a higher p-state, thereby reducing power consumption by the computer processor with very little, if any, reduction in performance by the computer processor. Examples of technologies that vary p-states of a computer processor include Intel's SpeedStep™ technologies, AMD's PowerNow!™ and Cool'n'Quiet™ technologies, VIA's LongHaul™ technologies, and the like. Readers of skill in the art will recognize that each of these technologies may be improved to be useful for managing power consumption of a computer according to embodiments of the present invention.

In the example of FIG. 1, the in-band power manager (130) is depicted as a software component of an operating system (154) for ease of explanation. Readers of skill in the art will recognize, however, that an in-band power manager (130) may alternatively be implemented as a component of an Advanced Configuration and Power Interface ('ACPI') module of an operating system or as a standalone software application separate from the operating system. The operating system (154), in-band power manager (130), and other software modules, in the example of FIG. 1, are shown in RAM (168), but many components of such software typically are stored in non-volatile memory also, such as, for example, on a disk drive (170) or in flash memory (134).

As mentioned above, the computer (152) of FIG. 1 includes a service processor (138) executing an out-of-band power manager. In the computer (152) of FIG. 1, the service processor (138) is connected to the processor (156) through an out-of-band bus (140). Such an out-of-band bus (140) may be implemented as a Low Pin Count ('LPC') bus, an Inter-Integrated Circuit ('I²C') bus, a System Management Bus ('SMBus'), a Serial Peripheral Interface ('SPI') Bus, and so on as will occur to those of skill in the art.

A service processor (138) is a specialized microcontroller which may be embedded on the motherboard of a computer. Different types of sensors built into a computer report to the service processor on metrics such as temperature, cooling fan speeds, operating system status, and so on. The service processor (138) may monitor the sensors and send alerts to a system administrator via a network if any of the monitored metrics exceed predefined limits, indicating a potential failure of the computer. An administrator may also remotely communicate with a service processor to take corrective action such as resetting or power cycling the computer to get a stalled operating system executing properly.

One example of a service processor is a baseboard management controller ('BMC') used in many blade servers. The BMC's basic functions are defined by the Intelligent Platform Management Interface ('IPMI') architecture. The BMC may manage an interface between system management software and platform hardware. Physical interfaces to a BMC may include SMBus busses, an RS-232 serial console, address and data lines, and an Intelligent Platform Management Bus ('IPMB') that enables the BMC to accept IPMI request messages from other management controllers in the system.

In the example of FIG. 1, the service processor (138) includes computer memory, such as RAM or flash memory, capable of storing an out-of-band power manager (132), a set of computer program instructions that manages power consumption of the computer according to embodiments of the present invention by determining, in dependence upon a power setpoint (144) and currently-measured operating metrics (134) of the computer processor (156), whether to approve the proposed p-state (204).

Currently-measured operating metrics (134) of the computer processor (156) are measurements of parameters of an operating computer processor. Examples of currently-measured operating metrics (134) of the computer processor (156) include a computer processor's current draw, power usage, case temperature, and so on as will occur to those of skill in the art.

A setpoint is a target value that an out-of-band power manager attempts to achieve through control of the computer processor. A power setpoint is a data structure that defines one or more preferred operating points for a particular operating state (145) of a computer processor. The out-of-band power manager uses the power setpoint to control power consumption, case temperature, and other operating metrics of the computer processor during operation of the processor.

An operating state (145) of a computer processor may be defined by one or more operating parameters of a computer processor, such as core voltage and clock speed of the processor. The out-of-band power manager attempts to achieve the power setpoint by varying the operating state (145) of the computer processor, that is varying operating parameters of the computer processor, throughout operation of the computer processor. 'Achieving' a power setpoint as used here means that a currently-measured operating metric of the same type as a preferred operating metric of the power setpoint is approximately equal to that preferred operating metric. Consider, for example, a power setpoint that defines a preferred operating metric for power consumption of computer processor at 10 watts. If the currently-measured operating metric for the power consumption of the computer processor is 10.0001 watts, the currently-measured operating metric is approximately equal to the preferred operating metric defined in the power setpoint and the preferred operating metric for the power setpoint is 'achieved.'

The out-of-band power manager (132) may vary the operating state dynamically during operation of the computer processor to achieve an optimum combination of power savings, case temperature, and computer processor performance. The out-of-band manger (132) may vary the operating state by calculating and setting a value for any of the operating parameters of the computer processor.

In computers of the prior art having an in-band and out-of-band power manager, there is no cooperation between the in-band and out-of-band power managers. Instead, p-states are set entirely by the in-band power manager in dependence upon only performance metrics, not a power setpoint or currently-measured operating metrics of the computer processor. In computers for which power consumption is managed according to embodiments of the present invention, by contrast, a p-state is proposed by the in-band power manager, in dependence upon the performance metrics, and approved, by the out-of-band power manager, in dependence upon a power setpoint and the currently-measured operating metrics of the computer processor. That is, in computers for which power is managed according to embodiments of the present invention, a p-state is set for a computer processor through cooperation between the in-band and out-of-band power managers in dependence upon more than performance metrics alone.

The out-of-band power manager (132) in the example of FIG. 1 may also notify the in-band power manger of the approval of the proposed p-state (204). Because a current p-state of the computer processor may be one factor that affects performance of a computer processor, the current p-state may be useful in determining, by the in-band power manager, another proposed p-state.

If the out-of-band power manager (132) approves the proposed p-state (204), the system of FIG. 1 may set (224) operating parameters of the computer processor according to the approved p-state (226). Setting operating parameters of a computer processor according to the approved p-state may be carried out either by the out-of-band power manager (132) or the in-band power manager (130). The in-band power manager (130) may set operating parameters of the computer processor according to the approved p-state upon notification of the approval of the proposed p-state (204). Alternatively, the out-of-band power manager may set operating parameters of the computer processor according to the approved p-state itself upon approving the proposed p-state (204). Setting operating parameters of a computer processor according to approved p-state may be effected by storing values representing a core voltage level and clock speed for the computer processor in computer memory designated for such a purpose, such as a register of the computer processor.

The computer (152) of FIG. 1 also includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers in which power consumption is managed according to embodiments of the present invention include Integrated Drive Electronics ('IDE') adapters, Small Computer System Interface ('SCSI') adapters, and others as will occur to those of skill in the art. Non-volatile computer memory also may be implemented as an optical disk drive, electrically erasable programmable read-only memory (so-called 'EEPROM' or 'Flash' memory) (134), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with a data communications network (100) and other computers (136). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful in computers for which power consumption is managed according to embodiments of the present invention include modems for wired dial-up communications, Ethernet (IEEE 802.3) adapters for wired data communications network communications, and 802.11 adapters for wireless data communications network communications.

The arrangement of computers, servers, networks, and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
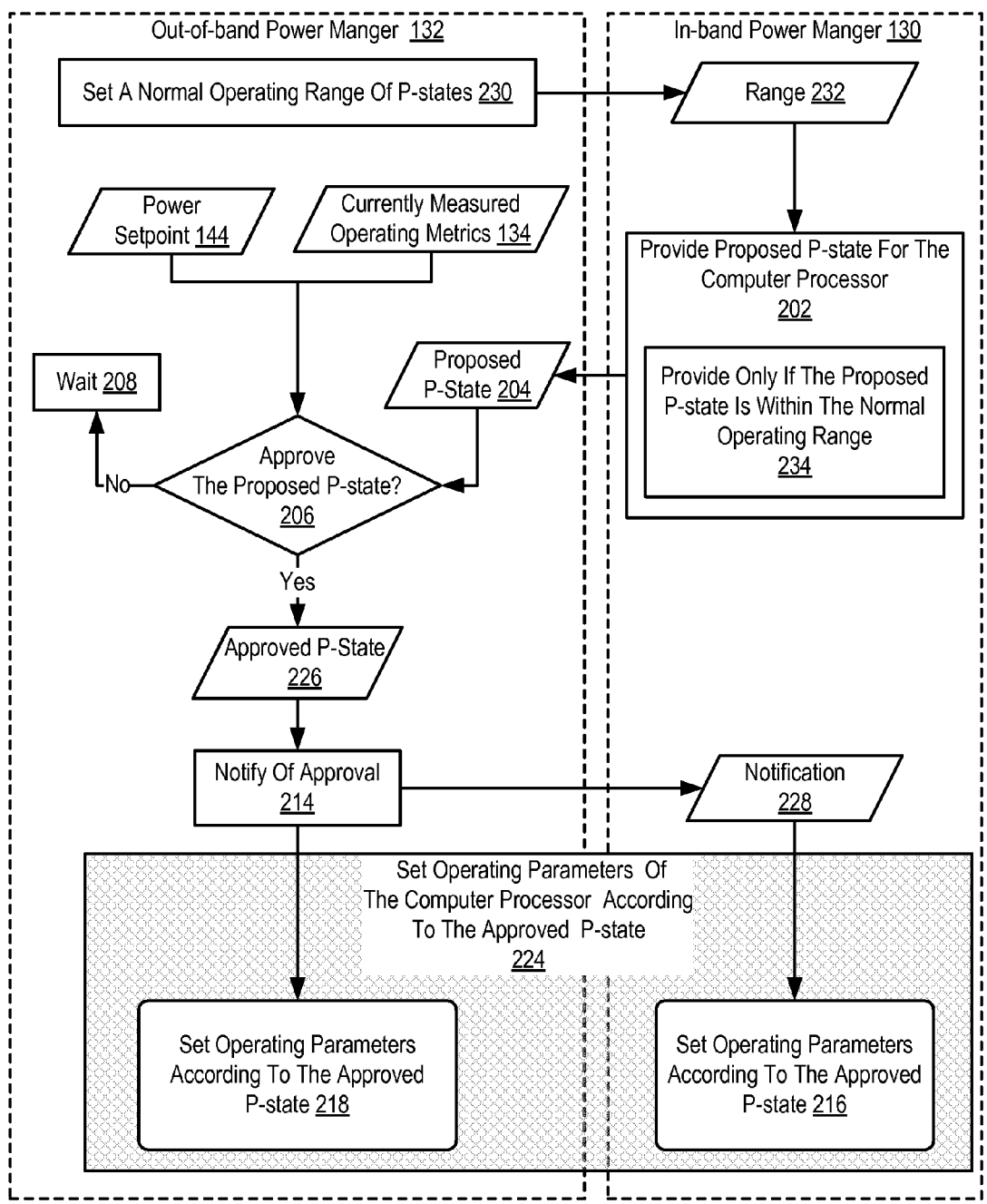
FIG. 2 sets forth a flow chart illustrating an exemplary method for managing power consumption of a computer according to embodiments of the present invention.

For further explanation, FIG. 2 sets forth a flow chart illustrating an exemplary method for managing power consumption of a computer according to embodiments of the present invention. In the method of FIG. 2, the computer (152 on FIG. 1) for which power consumption is managed includes a computer processor (156 on FIG. 1).

The method of FIG. 2 includes providing (202), by an in-band power manger (130) to an out-of-band power manager (132), a proposed performance state ('p-state') (204) for the computer processor. Providing (202), by an in-band power manger (130) to an out-of-band power manager (132), a proposed performance state ('p-state') (204) for the computer processor may be carried out in various ways including, for example, directly transmitting, from the in-band to the out-of-band power manager, values of the proposed p-state in a data packet on an out-of-band bus (140 on FIG. 1) according to an out-of-band bus protocol, such as Ethernet, TCP, IP, Point-to-Point protocol, or the like. Providing (202), by an in-band power manger (130) to an out-of-band power manager (132), a proposed performance state ('p-state') (204) for the computer processor may also be carried out, for example, by asserting, by the in-band power manager, a signal line of the out-of-band bus (140 on FIG. 1) that raises, in the out-of-band power manager, an interrupt indicating a newly proposed p-state, and responsive to the interrupt, reading, by the out-of-band power manager, values of the proposed p-state from a designated location in computer memory, such as a particular register of the computer processor, or a particular memory address in RAM. Readers of skill in the art will recognize that although only two examples of providing (202) a proposed p-state (204) for the computer processor are described here, providing (202) a proposed p-state (204) for the computer processor in accordance with embodiments of the present invention may be carried out in other ways and each such way is well within the scope of the present invention.

The method of FIG. 2 also includes determining (206), by the out-of-band power manager (132), in dependence upon a power setpoint (144) and currently-measured operating metrics (134) of the computer processor, whether to approve the proposed p-state (204). Determining (206), by the out-of-band power manager (132), in dependence upon a power setpoint (144) calculated and currently-measured operating metrics (134) of the computer processor, whether to approve the proposed p-state (204) may be carried out by determining whether the proposed p-state, if implemented, will conflict with the power setpoint. Consider, as an example, that the currently measured case temperature of the computer processor is 65 degrees Celsius while the power setpoint specifies a case temperature of 45 degrees. If current performance metrics of the computer processor indicate that the computer processor is under a heavy load, the in-band power manager, ignorant of the currently measured case temperature, may propose a p-state that increases the clock speed of the processor, which in turn, will increase the case temperature. That is, the proposed p-state, if implemented will cause a rise in case temperature, while the out-of-band power manager is attempting to achieve a lower case temperature to the value defined in the power setpoint. In such a case, the out-of-band power manager may determine not to approve the proposed p-state by determining that the proposed p-state conflicts with the power setpoint.

If the out-of-band power manager (132) does not approve the proposed p-state (204), the method of FIG. 2 continues by waiting for the next proposed p-state. While waiting, the out-of-band power manager (132) may continue to manage power consumption of the computer by varying operating parameters (220) of the computer processor in accordance with the power setpoint. If the out-of-band power manager (132) approves the proposed p-state (204), the method of FIG. 2 continues by notifying (214) the in-band power manger (130) of the approval. Notifying (214) the in-band power manger of the approval may be carried out by asserting, by the out-of-band power manager, a signal line of the out-of-band bus (140 on FIG. 1) that raises, in the in-band power manager, an interrupt indicating an approval, sending the notification of the approval on the out-of-band bus according to an out-of-band bus protocol, or in other ways as will occur to those of skill in the art.

The method of FIG. 2 also includes two alternative methods of setting (224) operating parameters of the computer processor according to the approved p-state (226). In the method of FIG. 2, setting (224) operating parameters of the computer processor according to the approved p-state may be carried out by the in-band power manager setting (218) the operating parameters upon notification (214) of the approval of the proposed p-state. That is, the in-band power manager (130) may effect a change from a previous p-state to the approved p-state (226). In the method of FIG. 2, as an alternative to setting (216) the operating parameters by the in-band power manager (130), the out-of-band power manger (132) may set (218) the operating parameters of the computer processor according to the p-state itself. That is, the in-band power manager may only propose, but never effect a change in p-state.

Figure 3:
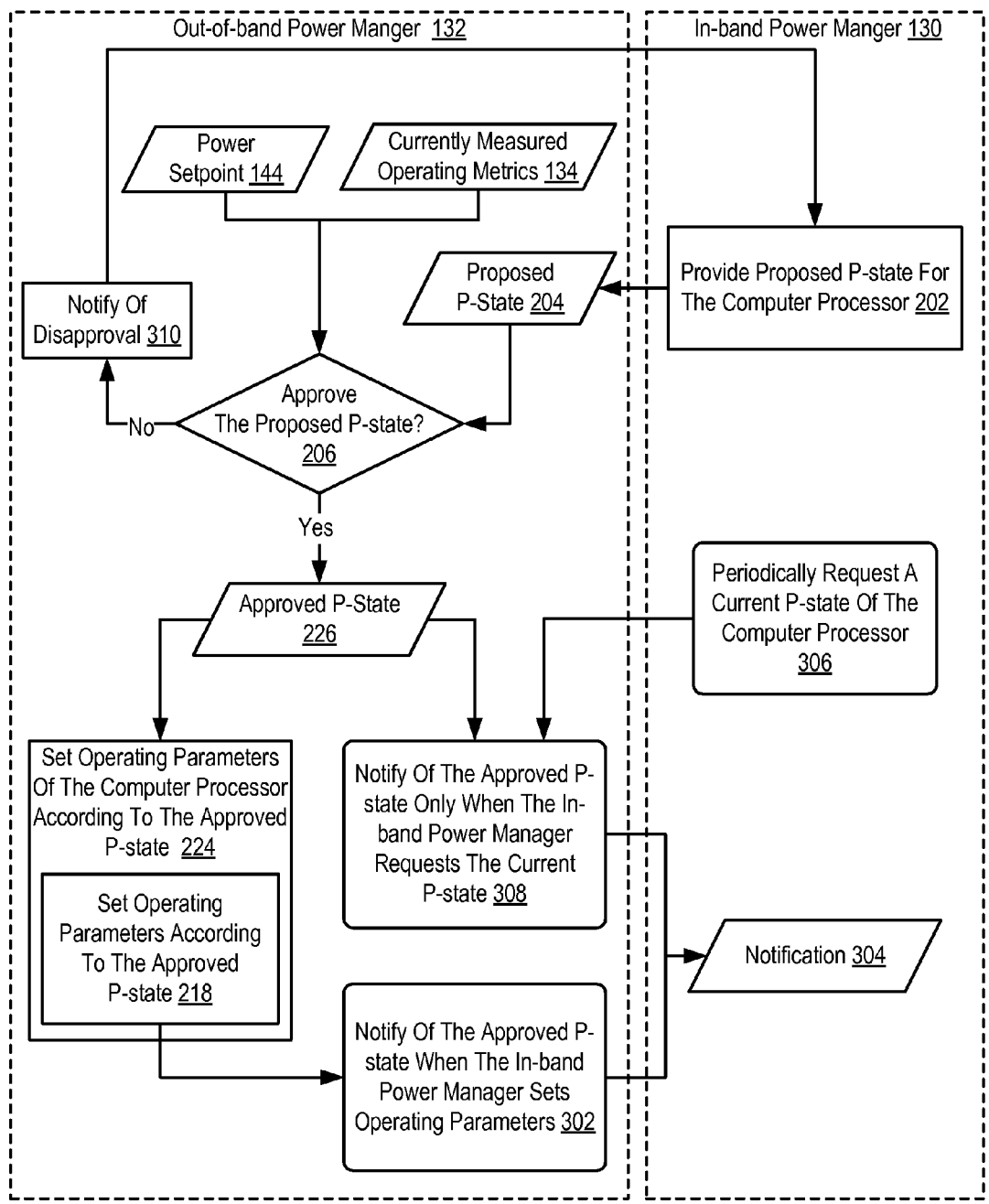
FIG. 3 sets forth a flow chart illustrating a further exemplary method for managing power consumption of a computer according to embodiments of the present invention.

For further explanation, FIG. 3 sets forth a flow chart illustrating a further exemplary method for managing power consumption of a computer according to embodiments of the present invention. In the method of FIG. 3, like the method of FIG. 2, the computer (152 on FIG. 1) for which power consumption is managed includes a computer processor (156 on FIG. 1).

The method of FIG. 3 is similar to the method of FIG. 2, including as it does, providing (202), by an in-band power manger (130) to an out-of-band power manager (132), a proposed performance state ('p-state') (204) for the computer processor; determining (206), by the out-of-band power manager (132), in dependence upon a power setpoint (144) and currently-measured operating metrics of the computer processor, whether to approve the proposed p-state (204); and if the out-of-band power manager (132) approves the proposed p-state (204), setting (224) operating parameters of the computer processor according to the approved p-state (226).

The method of FIG. 3 is also similar to the method of FIG. 2 in that, in the method of FIG. 3, setting (224) operating parameters of the computer processor according to the approved p-state (226) includes setting (218) operating parameters of the computer processor according to the approved p-state by the out-of-band power manager (130).

The method of FIG. 3 differs from the method of FIG. 2, however, in that the method of FIG. 3, includes periodically requesting (306), by the in-band power manager (130) from the out-of-band power manager (132), a current p-state of the computer processor and notifying (308) the in-band power manager (130) of the approved p-state (226) only when the in-band power manager (130) requests the current p-state. Periodically requesting (306), by the in-band power manager (130) from the out-of-band power manager (132), a current p-state of the computer processor may be carried out by requesting, from the out-of-band power manger through an out of band bus (140 on FIG. 1), the current p-state upon a predefined period of time, such as five minutes for example, or by requesting, from the out-of-band power manger through an out of band bus (140 on FIG. 1), the current p-state prior to a determination of a subsequent proposed p-state, or in other ways as will occur to those of skill in the art.

Periodically requesting a current p-state may be useful in reducing communications and processing overhead in embodiments where the out-of-band power manager approves the proposed p-state more often than not. Such embodiments may occur when operating metrics of the computer processor remain in a normal range during operation and computer processor load varies, but not to extremes. Consider, for example, an embodiment in which nine out of every ten proposed p-states is approved. Notifying the in-band power manager of every approval increases communications between the in-band and out-of-band power manager by comparison to only periodically notifying the in-band power manger. In such embodiments the in-band power manager, after providing a proposed p-state, may operate under the assumption that the p-state was approved and implemented by the out-of-band power manager.

As an alternative to notifying (308) the in-band power manager (130) of the approved p-state (226) only when the in-band power manager (130) requests the current p-state, the method of FIG. 2 also includes notifying (310) the in-band power manager (130) only if the out-of-band power manager (132) does not approve the proposed p-state (204). Consider again, for example, the embodiment in which nine out of every ten proposed p-states is approved. Notifying the in-band power manager only of disapprovals of the proposed p-states reduces communications between the in-band and out-of-band power manager by ninety percent in this example.

As yet another alternative to notifying (308) the in-band power manager (130) of the approved p-state (226) only when the in-band power manager (130) requests the current p-state, the method of FIG. 3 also includes notifying (302) the in-band power manager (130) of the approved p-state (226) when the out-of-band power manager (132) sets the operating parameters of the computer processor according to the approved p-state (218). Unlike embodiments mentioned above in which the out-of-band manager approves the proposed p-state more often than not, there are other embodiments in which the out-of-band power manager may rarely, if ever, approve the proposed p-state. In these embodiments communications between the in-band and out-of-band power manger as well as processing overhead may be reduced by notifying the in-band power manager only when the p-state is approved and the out-of-band power manager sets the operating parameters according to the approved p-state.

Exemplary embodiments of the present invention are described largely in the context of a fully functional computer for managing power consumption of a computer. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of managing power consumption of a computer, the computer comprising a computer processor, the method comprising:

providing, by an in-band power manager to an out-of-band power manager, a proposed performance state ('p-state') for the computer processor;

determining, by the out-of-band power manager, in dependence upon a power setpoint and currently-measured operating metrics of the computer processor, whether to approve the proposed p-state; and if the out-of-band power manager approves the proposed p-state, setting operating parameters of the computer processor according to the approved p-state.

2. The method of claim 1 wherein, if the out-of-band power manager approves the proposed p-state:

the method further comprises notifying the in-band power manger of the approval; and setting operating parameters of the computer processor according to the approved p-state further comprises setting, by the in-band power manager, operating parameters of the computer processor according to the approved p-state.

3. The method of claim 1 wherein setting operating parameters of the computer processor according to the approved p-state further comprises setting, by the out-of-band power manager, operating parameters of the computer processor according to the approved p-state.

4. The method of claim 3 further comprising notifying the in-band power manager of the approved p-state when the out-of-band power manager sets the operating parameters of the computer processor according to the approved p-state.

5. The method of claim 3 further comprising:
periodically requesting, by the in-band power manager from the out-of-band power manager, a current p-state of the computer processor; and
notifying the in-band power manager of the approved p-state only when the in-band power manager requests the current p-state.

6. The method of claim 1 further comprising:
notifying the in-band power manager only if the out-of-band power manager does not approve the proposed p-state.

7. The method of claim 1 wherein:
the method further comprises setting, by the out-of-band power manager, in the in-band power manager, a normal operating range of p-states; and
providing, by the in-band power manger to the out-of-band power manager, a proposed p-state further comprises providing the proposed p-state only if the proposed p-state is within the normal operating range.

8. A computer for which power consumption is managed, the computer comprising a computer processor and a service processor, computer memory operatively coupled to the computer processor and the service processor, the computer memory having disposed within it computer program instructions that, when executed by the computer processor, cause the computer to carry out the steps of:
providing, by an in-band power manager to an out-of-band power manager, a proposed performance state ('p-state') for the computer processor;
determining, by the out-of-band power manager, in dependence upon a power setpoint and currently-measured operating metrics of the computer processor, whether to approve the proposed p-state; and
if the out-of-band power manager approves the proposed p-state, setting operating parameters of the computer processor according to the approved p-state.

9. The computer of claim 8 wherein, if the out-of-band power manager approves the proposed p-state:
the computer further comprises computer program instructions that, when executed by the computer processor, cause the computer to carry out the step of notifying the in-band power manger of the approval; and
setting operating parameters of the computer processor according to the approved p-state further comprises setting, by the in-band power manager, operating parameters of the computer processor according to the approved p-state.

10. The computer of claim 8 wherein setting operating parameters of the computer processor according to the approved p-state further comprises setting, by the out-of-band power manager, operating parameters of the computer processor according to the approved p-state.

11. The computer of claim 10 further comprising computer program instructions that, when executed by the computer processor, cause the computer to carry out the step of notifying the in-band power manager of the approved p-state when the out-of-band power manager sets the operating parameters of the computer processor according to the approved p-state.

12. The computer of claim 10 further comprising computer program instructions that, when executed by the computer processor, cause the computer to carry out the steps of:
periodically requesting by the in-band power manager from the out-of-band power manager, a current p-state of the computer processor; and
notifying the in-band power manager of the approved p-state only when the in-band power manager requests the current p-state.

13. The computer of claim 8 further comprising computer program instructions that, when executed by the computer processor, cause the computer to carry out the step of:
notifying the in-band power manager only if the out-of-band power manager does not approve the proposed p-state.

14. The computer of claim 8 wherein:
the computer further comprises computer program instructions that, when executed by the computer processor, cause the computer to carry out the step of setting, by the out-of-band power manager, in the in-band power manager, a normal operating range of p-states; and
providing, by the in-band power manger to the out-of-band power manager, a proposed p-state further comprises providing the proposed p-state only if the proposed p-state is within the normal operating range.

15. A computer program product for managing power consumption of a computer, the computer comprising a computer processor, the computer program product disposed in a recordable computer readable medium, the computer program product comprising computer program instructions that, when executed by the computer processor, cause the computer to carry out the steps of:
providing, by an in-band power manager to an out-of-band power manager, a proposed performance state ('p-state') for the computer processor;
determining, by the out-of-band power manager, in dependence upon a power setpoint and currently-measured operating metrics of the computer processor, whether to approve the proposed p-state; and
if the out-of-band power manager approves the proposed p-state, setting operating parameters of the computer processor according to the approved p-state.

16. The computer program product of claim 15 wherein, if the out-of-band power manager approves the proposed p-state:
the computer program product further comprises computer program instructions that, when executed by the computer processor, cause the computer to carry out the step of notifying the in-band power manger of the approval; and
setting operating parameters of the computer processor according to the approved p-state further comprises setting, by the in-band power manager, operating parameters of the computer processor according to the approved p-state.

17. The computer program product of claim 15 wherein setting operating parameters of the computer processor according to the approved p-state further comprises setting, by the out-of-band power manager, operating parameters of the computer processor according to the approved p-state.

18. The computer program product of claim 17 further comprising computer program instructions that, when executed by the computer processor, cause the computer to carry out the step of notifying the in-band power manager of the approved p-state when the out-of-band power manager sets the operating parameters of the computer processor according to the approved p-state.

19. The computer program product of claim 17 further comprising computer program instructions that, when executed by the computer processor, cause the computer to carry out the steps of:

periodically requesting by the in-band power manager from the out-of-band power manager, a current p-state of the computer processor; and notifying the in-band power manager of the approved p-state only when the in-band power manager requests the current p-state.

20. The computer program product of claim 15 further comprising computer program instructions that, when executed by the computer processor, cause the computer to carry out the step of:

notifying the in-band power manager only if the out-of-band power manager does not approve the proposed p-state.

* * * * *